(12) United States Patent
Chae et al.

(10) Patent No.: US 11,085,517 B2
(45) Date of Patent: Aug. 10, 2021

(54) POWERTRAIN FOR VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-Si (KR); Soon Ki Eo, Ansan-Si (KR); Sun Sung Kwon, Anyang-Si (KR); Chon Ok Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 422 days.

(21) Appl. No.: 16/195,292

(22) Filed: Nov. 19, 2018

(65) Prior Publication Data

US 2020/0072334 A1 Mar. 5, 2020

(30) Foreign Application Priority Data

Aug. 29, 2018 (KR) .......................... 10-2018-0101903

(51) Int. Cl.
*F16H 37/08* (2006.01)
*F16H 48/36* (2012.01)
(Continued)

(52) U.S. Cl.
CPC ......... *F16H 48/22* (2013.01); *F16H 37/0813* (2013.01); *F16H 3/006* (2013.01);
(Continued)

(58) Field of Classification Search
CPC ............... F16H 37/0813; F16H 37/082; F16H 37/0833; F16H 48/10; F16H 48/11; F16H 48/20; F16H 48/22; F16H 48/24; F16H 48/36; F16H 2048/364; F16H 2048/366; F16H 2048/106; F16H 2200/2007; F16H 2200/2038; F16H 2200/0021; F16H 3/089; F16H 3/72; F16H 3/663; F16H 3/006; F16H 2003/0818
See application file for complete search history.

(56) References Cited

U.S. PATENT DOCUMENTS 6,634,986 B2 * 10/2003 Kima ...................... F16H 3/725
477/107
7,497,796 B2 * 3/2009 Ordo ...................... B62D 11/16
475/5
(Continued)

FOREIGN PATENT DOCUMENTS

KR 20120118925 A 10/2012

*Primary Examiner* — Charles A Fox
*Assistant Examiner* — Ryan P Dodd
(74) *Attorney, Agent, or Firm* — Morgan, Lewis & Bockius LLP

(57) ABSTRACT

A powertrain for a vehicle may include a main shaft; a transmission unit provided to selectively supply power of a motor to the main shaft with different gear ratios; a differential connected to the main shaft; two driveshafts provided to output power in opposed directions from the differential; a rotating ring rotatably mounted on the main shaft through a first clutch; and a second clutch provided to select either a state where the rotating ring is connected to the transmission unit or a state where the rotating ring is connected to a selected driveshaft of the two driveshafts.

9 Claims, 5 Drawing Sheets

(51) Int. Cl.
*F16H 48/10* (2012.01)
*F16H 48/22* (2006.01)
F16H 3/66 (2006.01)
F16H 3/00 (2006.01)

(52) U.S. Cl.
CPC .......... *F16H 3/663* (2013.01); *F16H 37/0833* (2013.01); *F16H 2048/364* (2013.01)

(56) References Cited

U.S. PATENT DOCUMENTS

| | | | |
|---|---|---|---|
| 10,598,257 B2 * | 3/2020 | Eo | B60K 17/12 |
| 2008/0004149 A1 * | 1/2008 | Mohan | F16H 48/22 |
| | | | 475/221 |
| 2012/0203412 A1 * | 8/2012 | Nakamura | B60K 6/48 |
| | | | 701/22 |
| 2013/0331227 A1 * | 12/2013 | Kato | B60W 20/40 |
| | | | 477/3 |

* cited by examiner

|  | CL1 | CL3 | CL2 |
|---|---|---|---|
| 1st-LSD | O | 1P | LSD |
| 1st | - | 1P | N |
| 1st - 2nd shift | △ → O → X | 2P | 2P |
| 2nd - 1st shift | O → △ → X | N → 1P | 2P |
| 2nd | - | 2P | N |
| 2nd -LSD | O | 2P | LSD |

# POWERTRAIN FOR VEHICLE

CROSS REFERENCE TO RELATED APPLICATION

The present application claims priority to Korean Patent Application No. 10-2018-0101903, filed Aug. 29, 2018, the entire contents of which is incorporated herein for all purposes by this reference.

BACKGROUND OF THE INVENTION

Field of the Invention

The present invention relates generally to a powertrain for a vehicle. More particularly, the present invention relates to a configuration of a powertrain for a vehicle having a limited slip differential (LSD) function.

Description of Related Art

In a powertrain for a vehicle, a differential is essential, but on a low friction road or a rough road, the vehicle cannot be driven by differential action. To solve this, it is necessary to have LSD function in powertrain.

The powertrain is configured to implement the LSD function and have low power transmission loss while having a simple structure, thus ensuring high power transmission efficiency.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle, the powertrain being configured to realize the LSD function while having a simple structure, and ensure high power transmission efficiency by minimizing power transmission loss during running of the vehicle, improving driving performance, fuel economy, and mileage of a vehicle.

In various aspects of the present invention, there is provided a powertrain for a vehicle, the powertrain including: a main shaft; a transmission unit provided to selectively supply power of a motor to the main shaft with different gear ratios; a differential connected to the main shaft; two driveshafts provided to output power in opposed directions from the differential; a rotating ring rotatably mounted on the main shaft through a first clutch; and a second clutch provided to select either a state where the rotating ring is connected to the transmission unit or a state where the rotating ring is connected to a selected driveshaft of the two driveshafts.

The transmission unit may include: a first stage drive gear and a second stage drive gear mounted on a rotation shaft driven by the motor; a first stage driven gear and a second stage driven gear rotatably mounted on the main shaft to be engaged with the first stage drive gear and the second stage drive gear, respectively; and a third clutch provided to select either a state where the main shaft is connected to the first stage driven gear or a state where the main shaft is connected to the second stage driven gear.

The first clutch may include a friction clutch configured to continuously vary a frictional force between the main shaft and the rotating ring.

The second clutch may be provided to allow the power completely shifted in the transmission unit to be transmitted to the rotating ring before transmitted to the main shaft.

The second clutch may be provided to allow the second stage driven gear of the transmission unit to be connected to the rotating ring.

Each of the second clutch and the third clutch may include a mesh type clutch configured to transmit power as a sleeve is moved in opposite sides from a neutral state to be engaged with each other.

The second clutch may be configured such that the rotating ring is used as a hub with a sleeve fitted thereover to be linearly slidable in an axial direction thereof.

The present invention is configured to realize the LSD function while having a simple structure, and ensure high power transmission efficiency by minimizing the power transmission loss during running of the vehicle, improving driving performance, fuel economy, and mileage of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figures 1, 2:
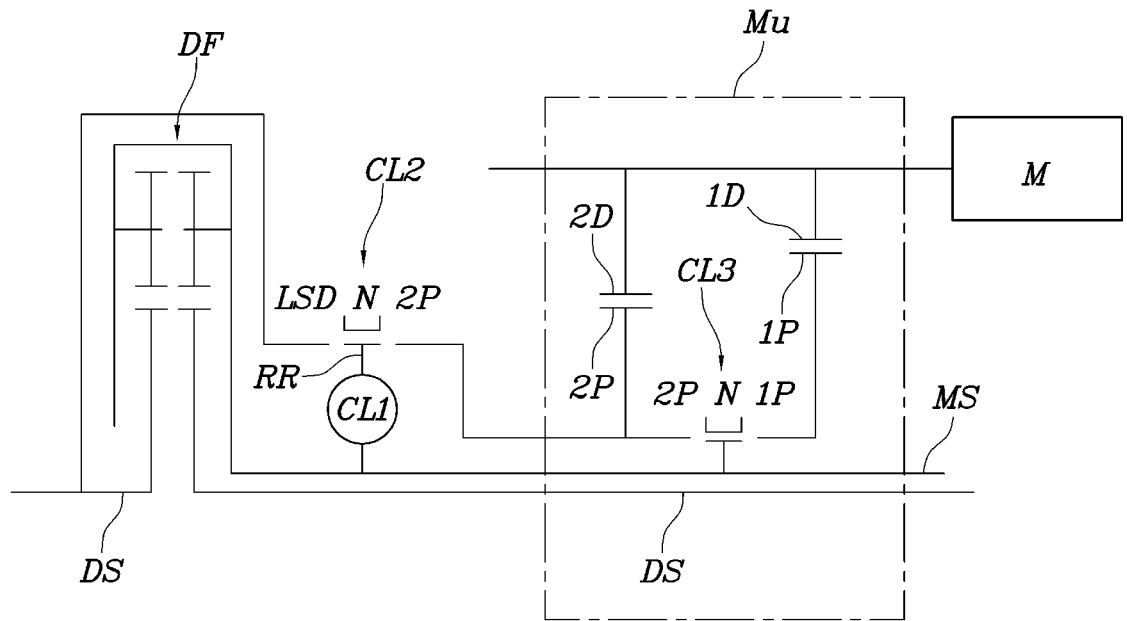
FIG. 1 is a view exemplarily illustrating a structure of a powertrain for a vehicle according to an exemplary embodiment of the present invention.
FIG. 2 is a table illustrating an operation mode implemented by the powertrain of FIG. 1.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a multi-stage transmission for a vehicle according to exemplary embodiments of the present invention will be described in detail with reference to the accompanying drawings.

Referring to FIG. 1, an exemplary embodiment of a powertrain for a vehicle according to an exemplary embodiment of the present invention may include a main shaft MS; a transmission unit MU provided to selectively supply power of a motor M to the main shaft MS with different gear ratios; a differential DF connected to the main shaft MS; two driveshafts provided to output power in opposed directions from the differential DF; a rotating ring RR rotatably mounted on the main shaft MS through a first clutch CL1; and a second clutch CL2 provided to select either a state where the rotating ring RR is connected to the transmission unit MU or a state where the rotating ring is connected to a selected driveshaft of the two driveshafts DS1 and DS2.

In other words, the exemplary embodiment is configured to perform the LSD function and to continuously transmit power to the two driveshafts DS1 and DS2 even when the transmission unit MU performs shifting by adding the first clutch CL1 and the second clutch CL2 to a basic powertrain which is configured to supply the power shifted by the transmission unit MU to the differential DF through the main shaft MS to output the same to the two driveshafts DS1 and DS2.

In the exemplary embodiment of the present invention, the selected driveshaft is the left driveshaft connected to the left drive wheel in the drawing, but the driveshaft connected to the right drive wheel may also be configured to function as the selected driveshaft.

In the exemplary embodiment of the present invention, the transmission unit MU includes: a first stage drive gear 1D and a second stage drive gear 2D mounted on a rotation shaft RS driven by the motor M; a first stage driven gear 1P and a second stage driven gear 2P rotatably mounted on the main shaft MS to be engaged with the first stage drive gear 1D and the second stage drive gear 2D, respectively; and a third clutch CL3 provided to select either a state where the main shaft MS is connected to the first stage driven gear 1P or a state where the main shaft is connected to the second stage driven gear 2P.

The first clutch CL1 includes a friction clutch configured to continuously vary a frictional force between the main shaft MS and the rotating ring RR. For example, a dry or wet disk clutch or the like may be used, which can adjust the amount of torque transmitted by varying the frictional force by the pressure applied between the two friction disks.

The second clutch CL2 is provided to allow the power completely shifted in the transmission unit MU to be transmitted to the rotating ring RR before transmitted to the main shaft MS.

For example, in the exemplary embodiment of the present invention, the second clutch CL2 is configured such that the second stage driven gear 2P of the transmission unit MU is connected to the rotating ring RR, but may be configured such that the first stage driven gear 1P is connected to the rotating ring RR.

Each of the second clutch CL2 and the third clutch CL3 includes a mesh type clutch configured to transmit power as a sleeve is moved in opposite sides from a neutral state to be engaged with each other.

For example, the second clutch CL2 and the third clutch CL3 may include a dog clutch or a synchromesh device provided with a synchronizer ring.

Furthermore, the second clutch CL2 may be configured such that the rotating ring RR is used as a hub with a sleeve fitted thereover to be linearly slidable in an axial direction thereof.

In other words, the rotating ring RR is configured to perform a function of the hub to select the state where the second stage driven gear 2P and the rotating ring RR are connected to each other or the state where the selected driveshaft and the rotating ring RR are connected to each other while the sleeve fitted over the rotating ring RR linearly slides in the axial direction thereof, thus contributing to reduction of the number of components and weight reduction.

For reference, the differential DF shown in FIG. 1 refers to a spur-gear differential, but the present invention is not limited thereto and a general differential configuration using bevel gear or planetary gear system may be used.

Furthermore, the first clutch CL1, the second clutch CL2, and the third clutch CL3 are configured to be controlled by a separate controller.

The powertrain for a vehicle configured as described above can implement operation modes shown in FIG. 2.

Figure 3:
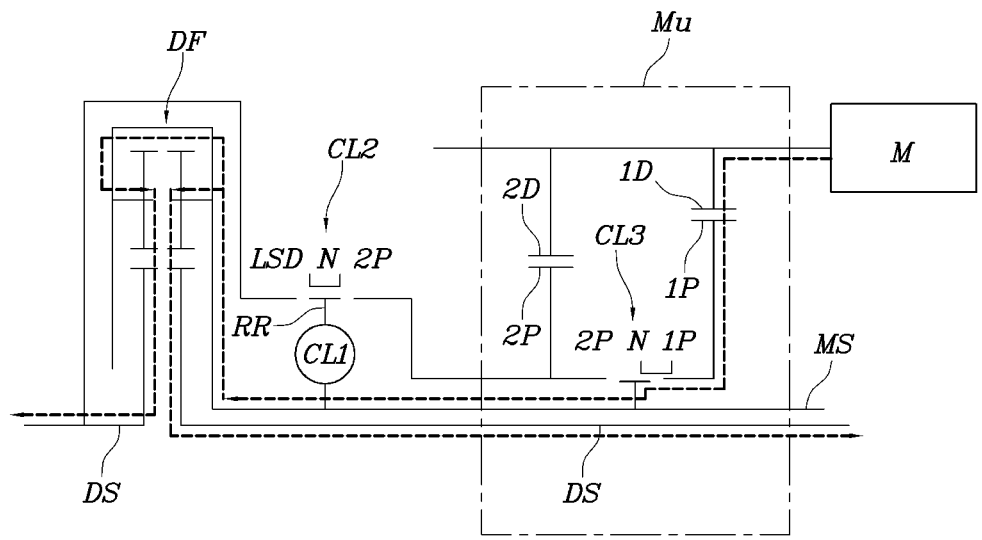
FIG. 3 is a view exemplarily illustrating a state where the powertrain of FIG. 1 implements a first stage operation mode.

FIG. 3 shows a state where a first stage operation mode is implemented, wherein the third clutch CL3 connects the first stage driven gear 1P to the main shaft MS.

Accordingly, the power of the motor M is shifted to the first gear ratio at the first stage drive gear 1D and the first stage driven gear 1P, is transmitted to the differential DF through the main shaft MS, and is delivered to the two drive wheels, not shown, through the two driveshafts.

Figure 4:
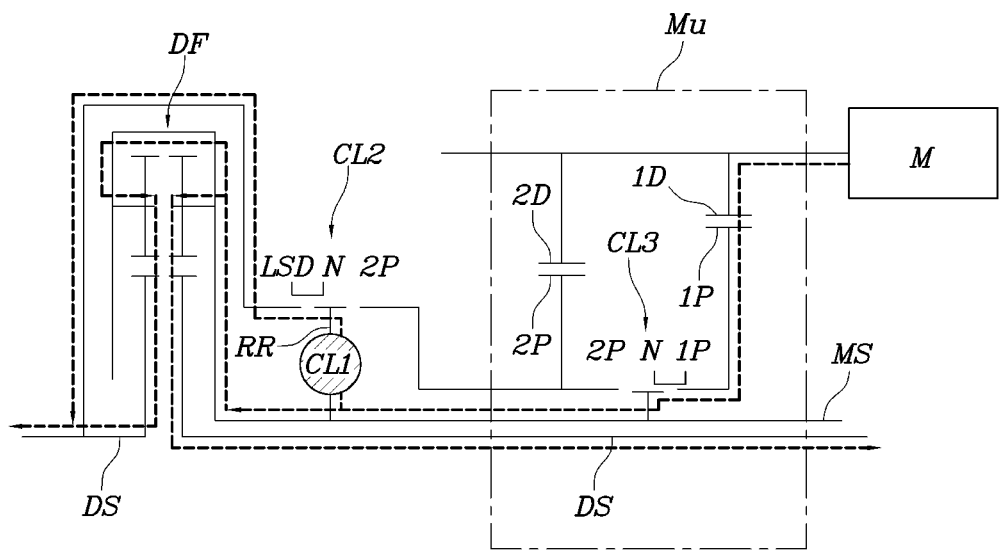
FIG. 4 is a view exemplarily illustrating a state where the powertrain of FIG. 1 implements a first stage-LSD operation mode.

FIG. 4 shows a state where a first stage-LSD operation mode is implemented, wherein the third clutch CL3 connects the first stage driven gear 1P to the main shaft MS, the second clutch CL2 connects the rotating ring RR to the selected driveshaft by the sleeve selecting the LSD, and the first clutch CL1 for a frictional force of the required level for the LSD function.

Accordingly, the power of the motor M is sifted to the first gear ratio, and then is transmitted to the two driveshafts through the main shaft MS and the differential DF, wherein the differential function of the differential DF is limited by the first clutch CL1 and the second clutch CL2 according to the degree to which the selected driveshaft is connected to the main shaft MS, and when the first clutch CL1 is fully engaged, both the main shaft MS and the two driveshafts rotate at the same speed, completely limiting the differential function, thus allowing the vehicle to run smoothly even on a low friction road or a rough road.

Of course, the degree of the above described limited slip differential function may be adjusted by adjusting the frictional force of the first clutch CL1.

Figure 5:
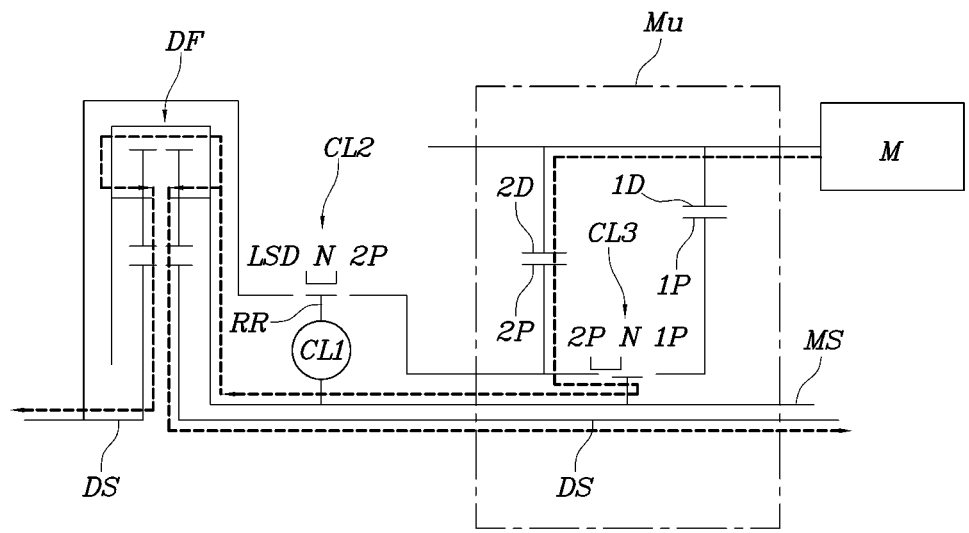
FIG. 5 is a view exemplarily illustrating a state where the powertrain of FIG. 1 implements a second stage operation mode.

FIG. 5 shows a state where a second stage operation mode is implemented, wherein the third clutch CL3 connects the second stage driven gear 2P to the main shaft MS, such that the power from the motor M is sifted to the second gear ratio and then is transmitted to the differential DF through the main shaft MS.

Figure 6:
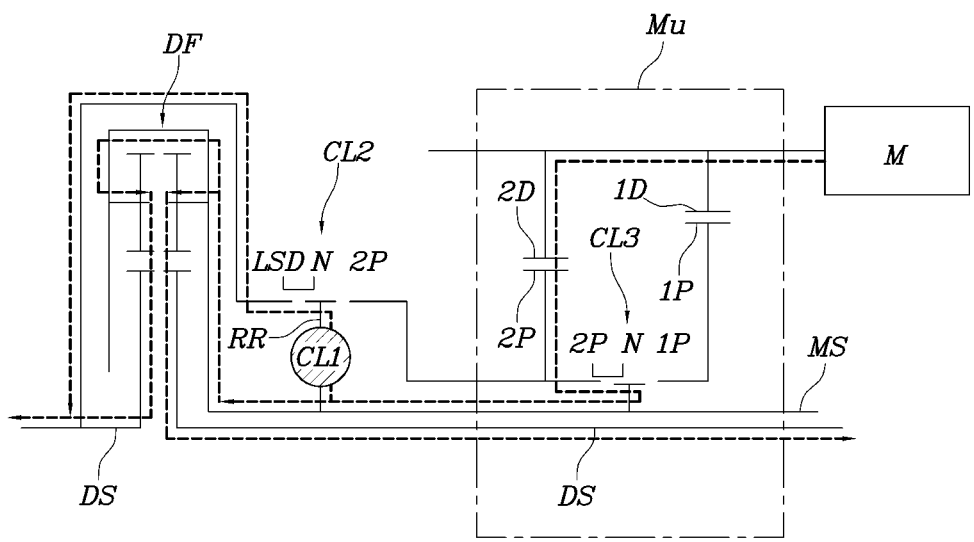
FIG. 6 is a view exemplarily illustrating a state where the powertrain of FIG. 1 implements a second stage-LSD operation mode.

FIG. 6 shows a state where a second stage-LSD operation mode is implemented, wherein in the state where the third clutch CL3 connects the second stage driven gear 2P to the main shaft MS as shown in FIG. 5, the sleeve of the second clutch CL2 selects the LSD, such that the rotating ring RR is connected to the selected driveshaft and the frictional force is generated by the first clutch CL1, limiting the differential function of the differential DF.

Figure 7:
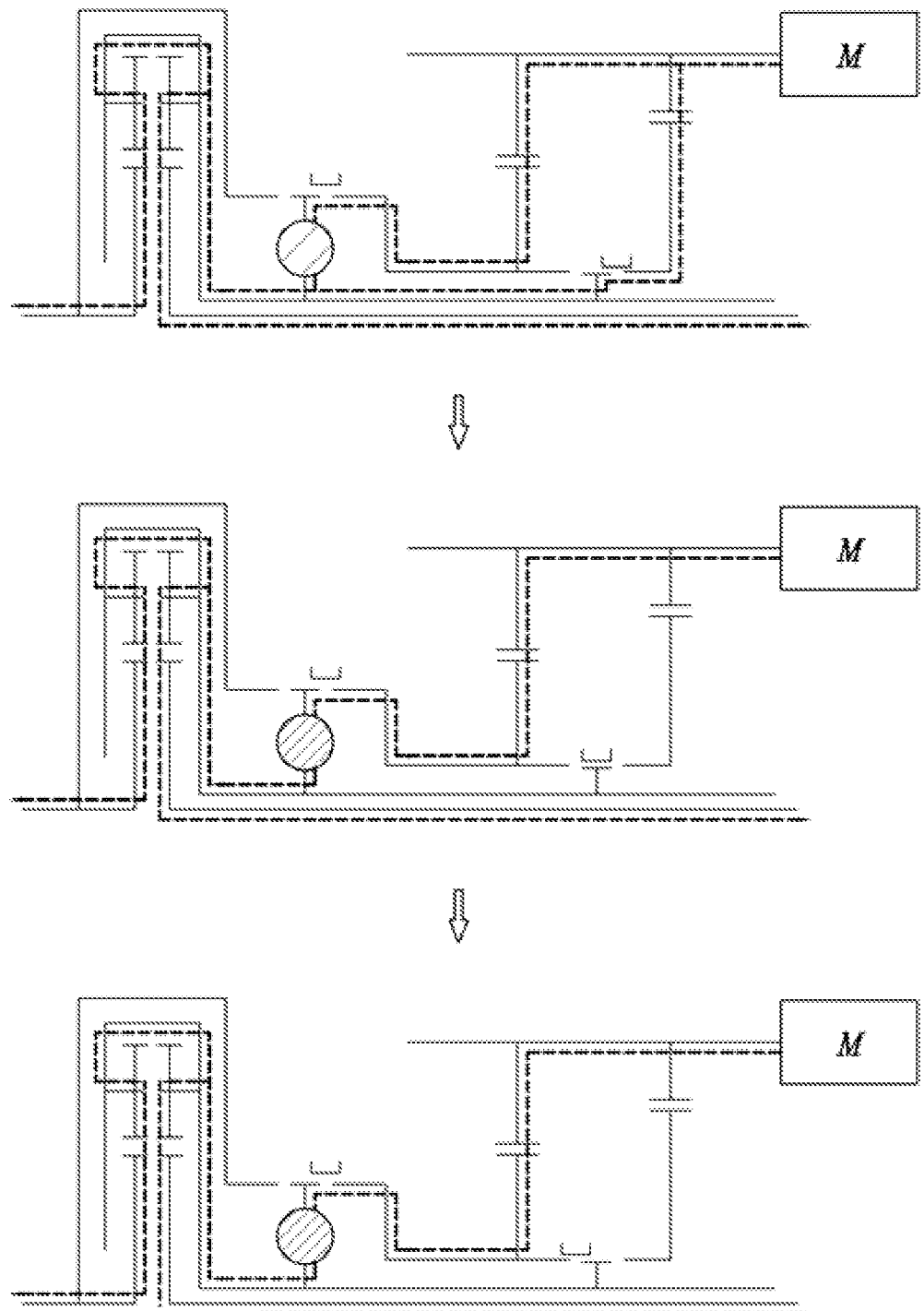
FIG. 7 is a view exemplarily illustrating a process of shifting from the first stage to the second stage by the powertrain of FIG. 1.

FIG. 7 sequentially illustrates a process of shifting from the first stage operation mode of FIG. 3 to the second stage operation mode of FIG. 5. Firstly, in the state where the sleeve of the second clutch CL2 is connected to the second stage driven gear 2P, the frictional force is generated by the first clutch CL1, whereby the power from the motor M is transmitted to the differential DF also through the first clutch CL1.

Next, by releasing the third clutch CL3 to neutral and increasing the frictional force of the first clutch CL1, the rotation speed of the motor M is decreased to synchronize with the second speed.

Next, the second stage driven gear 2P is connected to the main shaft MS by use of the third clutch CL3.

As such, when the frictional force of the first clutch CL1 is released and the second clutch CL2 is released to the neutral state, shifting to the second stage operation mode as shown in FIG. 5 is completed.

Figure 8:
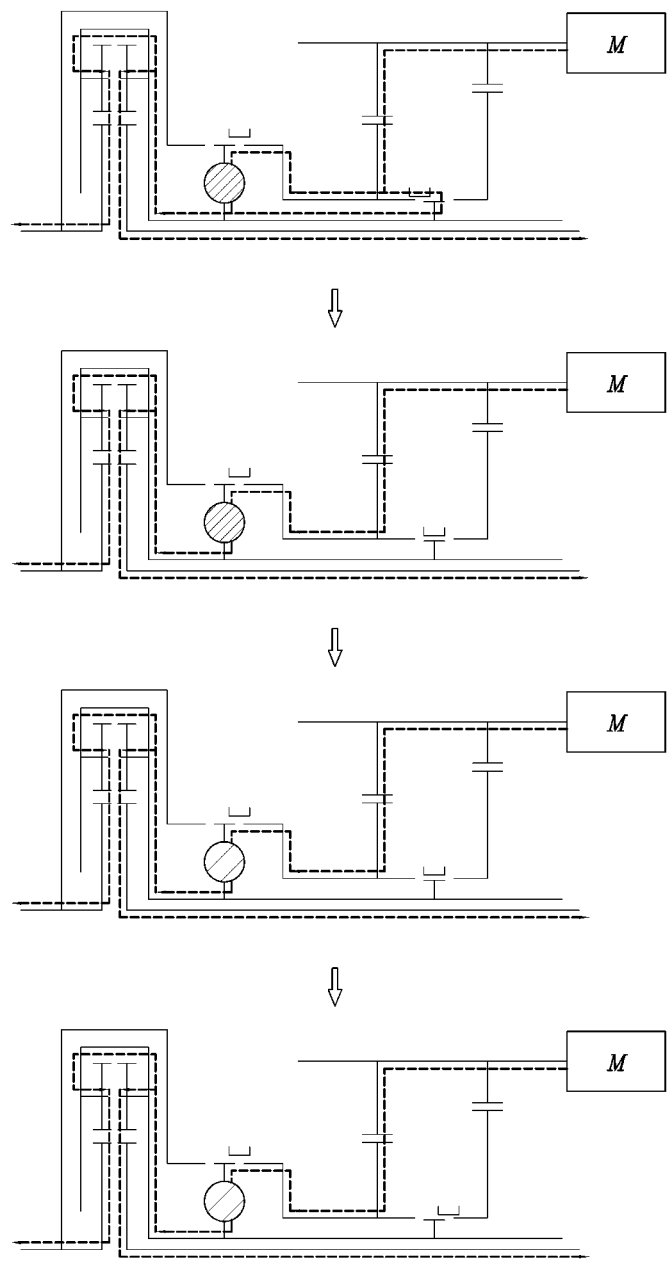
FIG. 8 is a view exemplarily illustrating a process of shifting from the second stage to the first stage by the powertrain of FIG. 1.

Meanwhile, FIG. 8 sequentially illustrates a process of shifting from the second stage operation mode of FIG. 5 to the first stage operation mode of FIG. 3.

Firstly, the second stage driven gear 2P is connected to the rotating ring RR by use of the second clutch CL2 and the first clutch CL1 is engaged.

Next, in the state of releasing the third clutch CL3 to neutral, by transmitting the power through the second clutch CL2 and the first clutch CL1, the running condition at the second stage is maintained.

Next, the frictional force of the first clutch CL1 is reduced to slip while increasing the number of revolutions of the motor M to synchronize the rotation speed of the first stage driven gear 1P with the main shaft MS.

Next, the first stage driven gear 1P is connected to the main shaft MS by use of the third clutch CL3.

As such, when the frictional force of the first clutch CL1 is fully released and the second clutch CL2 is released to neutral, shifting to the first stage operation mode as shown in FIG. 3 is completed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus comprising:
    a main shaft;
    a transmission unit provided to selectively supply power of a motor to the main shaft with different gear ratios;
    a differential connected to the main shaft;
    two driveshafts engaged to the differential and provided to output power in opposed directions from the differential;
    a first clutch;
    a rotating ring rotatably mounted on the main shaft through the first clutch; and
    a second clutch provided to select either a state where the rotating ring is connected to the transmission unit or a state where the rotating ring is connected to a selected driveshaft of the two driveshafts,
    wherein the second clutch is provided to allow power shifted in the transmission unit to be transmitted to the rotating ring before being transmitted to the main shaft.

2. The powertrain apparatus of claim 1, wherein the transmission unit includes:
    a first drive gear and a second drive gear mounted on a rotation shaft driven by the motor;
    a first driven gear and a second driven gear rotatably mounted on the main shaft and engaged with the first drive gear and the second drive gear, respectively; and
    a third clutch provided to select either a state where the main shaft is connected to the first driven gear or a state where the main shaft is connected to the second driven gear.

3. The powertrain apparatus of claim 2, wherein the first clutch includes a friction clutch configured to vary a frictional force between the main shaft and the rotating ring.

4. The powertrain apparatus of claim 2, wherein the second clutch is provided to selectively allow the second driven gear of the transmission unit to be connected to the rotating ring.

5. The powertrain apparatus of claim 2, wherein each of the second clutch and the third clutch includes a mesh type clutch configured to transmit power as a sleeve is moved in opposite directions from a neutral state.

6. The powertrain apparatus of claim 2, wherein the second clutch is configured such that the rotating ring is used as a hub with a sleeve fitted thereover to be linearly slidable in an axial direction thereof.

7. The powertrain apparatus of claim 1, wherein the two driveshafts include:
    a first driveshaft continuously engaged to the main shaft; and
    a second driveshaft continuously engaged to the main shaft and selectively connectable to the rotating ring,
    wherein the second driveshaft is the selected driveshaft of the two driveshafts.

8. The powertrain apparatus of claim 7, wherein the transmission unit includes:
    a first drive gear and a second drive gear mounted on a rotation shaft driven by the motor; and
    a first driven gear and a second driven gear rotatably mounted on the main shaft and engaged with the first drive gear and the second drive gear, respectively,
    wherein the second clutch is configured to select either a state where the rotating ring is connected to the second driven gear of the transmission unit or a state where the rotating ring is connected to the second driveshaft of the two driveshafts.

9. The powertrain apparatus of claim 8, wherein the transmission unit further includes:
a third clutch provided to select either a state where the main shaft is connected to the first driven gear or a state where the main shaft is connected to the second driven gear.

* * * * *